(12) United States Patent
Flores et al.

(10) Patent No.: US 10,272,536 B2
(45) Date of Patent: Apr. 30, 2019

(54) ROLLER TOOL FOR MAKING A BRAKE DISK

(71) Applicant: FORD GLOBAL TECHNOLOGIES, LLC, Dearborn, MI (US)

(72) Inventors: Gerhard Flores, Ostfildern (DE); Josef Koepp, Cologne (DE); Valeri Hartmann, Erftstadt (DE); Clemens Maria Verpoort, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/272,000

(22) Filed: Sep. 21, 2016

(65) Prior Publication Data

US 2017/0008142 A1    Jan. 12, 2017

Related U.S. Application Data

(62) Division of application No. 14/489,561, filed on Sep. 18, 2014, now Pat. No. 9,481,067.

(30) Foreign Application Priority Data

Sep. 20, 2013 (DE) .................... 10 2013 218 898

(51) Int. Cl.
*B24B 7/16* (2006.01)
*B24B 7/00* (2006.01)
(Continued)

(52) U.S. Cl.
CPC ................. *B24B 7/16* (2013.01); *B24B 7/00* (2013.01); *F16D 65/12* (2013.01); *F16D 65/127* (2013.01);
(Continued)

(58) Field of Classification Search
CPC .......... B21B 27/005; B23B 5/04; B24D 5/00; B24D 5/02; B24B 19/28
See application file for complete search history.

(56) References Cited

U.S. PATENT DOCUMENTS 944,238 A * 12/1909 Heys ...................... B24B 19/28
                                                           451/159
2,122,978 A    7/1938 Eldridge et al.
(Continued)

FOREIGN PATENT DOCUMENTS

DE    102006004769 A1    8/2007
DE    102006045275 B3    2/2008
(Continued)

*Primary Examiner* — Timothy V Eley
(74) *Attorney, Agent, or Firm* — Ray Coppiellie; Brooks Kushman P.C.

(57) ABSTRACT

The present invention in one or more embodiments provides a roller tool for roughening a friction ring of a brake disk, the roller tool including a roller body including inner and outer ends and a casing surface positioned therebetween, the inner end differing in cross-section dimension than the outer end, the casing surface including thereupon one or more protrusions for contacting the friction ring. The roller tool may further include a support frame supporting the roller body. The support frame may include a short leg connected to the outer end of the roller body and a long leg connected to the inner end of the roller body.

18 Claims, 6 Drawing Sheets

(51) Int. Cl.
*F16D 65/12* (2006.01)
*B24D 5/02* (2006.01)
*B24B 19/28* (2006.01)
*B21B 27/00* (2006.01)
*B23B 5/04* (2006.01)
*F16D 69/00* (2006.01)

(52) U.S. Cl.
CPC ............... *B21B 27/005* (2013.01); *B23B 5/04* (2013.01); *B24B 19/28* (2013.01); *B24D 5/02* (2013.01); *F16D 2069/004* (2013.01); *F16D 2250/0038* (2013.01)

(56) References Cited

U.S. PATENT DOCUMENTS

| | | | |
|---|---|---|---|
| 3,500,589 A | 3/1970 | Ellege | |
| 3,823,627 A | 7/1974 | Scharfen | |
| 4,262,452 A | 4/1981 | Lopez | |
| 5,305,556 A * | 4/1994 | Kopp | B06B 3/00 451/124 |
| 5,507,686 A | 4/1996 | Wolters | |
| 5,518,438 A * | 5/1996 | Munoz | B24B 19/16 451/11 |
| 5,775,983 A * | 7/1998 | Shendon | B24B 53/017 451/285 |
| 5,899,796 A * | 5/1999 | Kamiyama | E21B 29/06 166/55.7 |
| 7,144,314 B2 * | 12/2006 | Pontieri | B24D 5/02 451/495 |
| 7,416,476 B2 * | 8/2008 | Yokoyama | B24B 9/002 451/57 |
| 8,323,074 B2 | 12/2012 | Maeda et al. | |
| 2004/0209552 A1 * | 10/2004 | Kamamura | B24B 5/01 451/5 |
| 2010/0101526 A1 | 4/2010 | Schaefer et al. | |
| 2012/0058363 A1 | 3/2012 | Verpoort et al. | |
| 2013/0161132 A1 | 6/2013 | Dupuis | |
| 2013/0295824 A1 * | 11/2013 | Hasegawa | B24D 15/082 451/349 |
| 2013/0333989 A1 | 12/2013 | Oezer | |
| 2015/0307979 A1 | 10/2015 | Grabiec et al. | |
| 2016/0025167 A1 | 1/2016 | Broda et al. | |

FOREIGN PATENT DOCUMENTS

| | | |
|---|---|---|
| DE | 202009014180 U1 | 2/2010 |
| DE | 102009058178 A1 | 6/2011 |
| DE | 102010052735 A1 | 11/2011 |
| DE | 102010064350 A1 | 7/2012 |
| DE | 102011075821 A1 | 11/2012 |
| DE | 102012207455 A1 | 12/2012 |
| DE | 102011087575 A1 | 6/2013 |

* cited by examiner

ROLLER TOOL FOR MAKING A BRAKE DISK

RELATED APPLICATION(S)

This application is a division and claims the benefit of the U.S. patent application Ser. No. 14/489,561 filed on Sep. 18, 2014, now U.S. Pat. No. 9,481,067 issued Nov. 1, 2016, which in turn claims the benefit of Germany Patent Application No.: DE 102013218898.6 filed on Sep. 20, 2013, the entire contents thereof being incorporated herein by reference.

TECHNICAL FIELD

The present invention in one or more embodiments relates to tool and method for making a brake disk.

BACKGROUND

In vehicles, in particular motor vehicles, disk brakes are by far the most common type of brake system. Disk brakes generally include a brake disk and a brake caliper surrounding the brake disk on the edge. The brake disk is connected to the wheel of the vehicle to be braked by a wheel hub mounted rotatably in the stub axle. In contrast, the brake caliper is fixed to the stub axle. The actual deceleration is achieved by brake pads which may be placed against on the brake disk and are arranged on both sides of the disk between it and the brake caliper.

Depending on application, brake disks may include iron or also of carbon ceramic or aluminum. Brake disks often have a surface which is as wear-resistant and emits as little dust as possible. To achieve this, it is desirable that the surface be as hard as possible. For this reason, brake disks with a metallic base body are often fitted with a suitable coating. The coating extends at least over an annular surface region of the base body which serves as a friction face or friction ring for the brake pads. This is normally a flat surface region which is composed of at least two friction faces extending parallel to each other and defining the friction ring at the sides and hence in its thickness.

Since brake disks are mass-produced consumable items, these are made primarily of iron, in particular cast iron. Without the provision of a coating, iron oxide would form rapidly. This is a corrosive process which may destroy the brake disk over time. As well as the deterioration in appearance caused by the light rust film, the formation of surface rust leads in many cases to an acoustic deterioration which is expressed in an unpleasant squealing.

A suitable coating may for example be achieved with thermal spraying. Here the material to be applied to the surface of the base body is first softened by the effect of heat and accelerated in the form of individual particles through a gas flow. When the particles hit, a purely mechanical connection is created without melting the surface of the base body. These materials may be metals or oxide-ceramic or carbide materials.

In order to improve the connection between the coating and the surface region, the surface region is first roughened. Pure sandblasting or corundum blasting achieves only a moderate bonding of the coating to the surface region of the base body.

DE 10 2011 075 821 A1 describes a brake disk and a method for its production. The brake disk includes a base body, on the surface of which a wear-protection layer is applied, for example by high velocity oxyfuel flame spraying (HVOF) and/or atmospheric plasma spraying (APS). To improve the connection between the surface of the base body and the wear protection layer to be applied, the surface is suitably pretreated. For this the use of laser beams is proposed, to obtain a suitable surface topography of the base body. A suitable surface topography is for example the application of a meandering and/or groove-like and/or spiral structure.

The roughening of the surface region which may be obtained by laser radiation is better than that of sand- or corundum-blasting. However here again, sometimes an insufficiently durable connection is achieved between the base body and the coating. The reason for this is the absence of undercuts which achieve a mechanically strong bond. In order to create such advantageous undercuts, various further methods are known in the prior art.

DE 10 2010 064 350 A1 discloses a brake disk with a coating. In this context, a method is shown with which the coating may be applied to a surface of the brake disk. In order to increase the adhesion strength between the brake disk and the coating, the surface of the brake disk is fitted with recesses. The side walls defining the recess are configured such that a width of the recess increases with the depth. As a result, at least one side wall of the recess runs at an angle in relation to a surface of the brake disk so that at least one undercut is produced. These recesses are produced in the surface of the brake disk by material removal, for example via a tool with corresponding cutting edges. The undercut allows a bonding of the coating to be applied onto the surface of the brake disk and in particular into its recesses.

Furthermore DE 10 2006 045 275 B3 describes a method for preparation of a surface to be coated on a base body of a product. To achieve a high adhesion of the coating to the base body, its surface is machined by material removal before application of the coating. The resulting recess is configured such that the side walls defining the recess are produced at an angle to each other. The recess tapers from its base towards the surface, whereby the opposing side walls of the recess each form an undercut (dovetail). To achieve this double undercut, a material-removing tool is disclosed which has two opposing cutting surfaces oriented correspondingly to each other.

According to DE 10 2006 004 769 A1, to improve the adhesion of thermally sprayed layers on a metal surface, it should first be roughened. For this the arrangement of indentations or recesses is proposed which are formed by material removal or chipping. The parts of the metal surface remaining between the recesses or indentations form corresponding projections, fluting, bulges or embossing, which in the next step are mechanically formed or broken down. The aim is to form a plurality of undercuts with the parts of the metal surface extending into the respective recesses or indentations. This achieves a mechanical bonding between the prepared metal surface and the layer thermally sprayed onto this. Alternatively the raised parts may be melted by the effect of heat, and after setting, the melted droplets form the undercuts. Also a material-removing machining of the raised parts of the metal surface is disclosed, which includes an only incomplete metal detachment. As a result additional undercuts are created which are formed by partly bent or folded parts of the machined metal surface. To bend the raised parts of the metal surface, in particular a rolling process is proposed, or an obliquely applied pressing or blasting method, for example with a fine round powder, and sand-blasting, corundum-blasting or bead-blasting. In the rolling process it is considered advantageous if the roughness (Rz value) of the metal surface is reduced by the rolling.

DE 10 2010 052 735 A1 discloses a brake disk and a method for its production in which a brake disk base body is given a thermal spray coating. To improve the adhesion of the spray coating, here again a suitable superficial preparation is taught. This includes the arrangement of at least one recess groove in the base body of the brake disk. If several recess grooves are made in the brake disk base body by means of a material-removal process, the grooves are arranged in the form of a spiral or concentric circles. At least one of the walls defining the recess grooves is configured such that this extends at least partly into the recess groove in order to form at least one undercut in the recess groove. In addition, immediately after production of the recess grooves, a forming process is carried out in which the parts defining the recess grooves are broken/formed to create the undercuts. To produce the recess grooves and form the remaining surface parts, it is proposed to clamp the brake disk base body in a lathe. During its notation, a cutting tool and a forming tool are guided, starting on a first machining radius of the brake disk base body, radially outward or inward over its surface. The forming process is carried out directly after the cutting process to produce the recess grooves. A suitable tool is a dual plate which includes a cutting and a forming plate. Thus after production of the recess groove by the cutting plate, immediately afterwards the forming plate of the dual plate is used for the necessary forming step. Finally the prepared surface of the brake disk base body is spray-coated.

DE 10 2011 087 575 A1 describes a method for production of a composite component coated with a friction layer. The composite component may be a brake disk. However the composite component has pin-like raised parts formed as protrusions, which are produced during the process of casting the surface to be coated. The pin-like protrusions are distributed equidistantly from each other over the surface to be coated. Grooves which are cut into the base body by material removal are not disclosed in DE 10 2011 087 575 A1. However DE 10 2011 087 575 A1 also discloses undercuts at the pin-like protrusions. For this the undercuts are made approximately rotationally symmetrically to the longitudinal center axis of the pin-like protrusion and have a mushroom head form. The undercuts are produced by plastic deformation, e.g. by flattening or rolling, like in the method known for riveting, so that the head mushrooms under force.

DE 10 2012 207 455 A1 is concerned with a tool for mechanical roughening of an inner surface of a bore and with a corresponding method using this tool. In particular cylinder bores of internal combustion engines may be prepared suitably to allow their subsequent thermal coating. For preparing the surface, a combination of material removal and rolling is disclosed. First a profiled cutting plate is used with which linear recesses are made in the surface of the substrate. Profile webs remaining between the recesses are then rolled with a roller. The pressure exerted on the profile webs by the roller causes the profile webs to be reduced by up to 50% of their initial height. The cylindrical roller used for this has diamond grains arranged on its casing surface. The cylindrical roller has a constant diameter over its extension. After rolling, the edges of the profile webs are deformed such that material overhangs and micro cracks occur in the form of undercut-like and hence form-fit contours. The diamond grains create crater-like indentations on the heads of the profile webs. Depending on application, the roller is guided such that this either just rolls on the profile web or slides on this due to a non-orthogonal axial position to the course of the profile web. In the latter case, as well as indentations, additional scoring is produced which is attributable to the material-removal effect of the diamond grains partly sliding on the profile web. Also DE 10 2012 207 455 A1 discloses a possible conical design of rollers which, as they pass increasingly axially over the machining point, build up an increasing pressure and hence cause an increasing deformation of the webs.

DE 20 2009 014 180 U1 is concerned with cylinder bores in which coatings are applied thermally which, after final machining, have certain desirable properties in relation to friction and wear. A material-removal process to produce profile webs is combined with a rolling process for forming the profile webs. The forming tool has a profiling. The profiling may be formed as triangular peaks, wherein however also a profile in the form of a recessed curvature may be provided. It is furthermore proposed to allow two profiled forming tools to follow each other. A first forming tool has a notch in which the following forming tool engages to produce the final profile.

DE 10 2009 058 178 A1 discloses a method for surface treatment of cylinder bores in which firstly, recesses and bulges are produced by means of material-removal machining. Undercuts are produced by forming the bulges, wherein a spray coating is applied to the surface. The principle of recess swaging is used for forming, wherein the tappets serving as a forming element of a swaging machine are tapped radially outward against portions of the bulges of an inner face of the hollow cylinder.

The known methods allow the formation of undercuts on at least one surface region of the brake disk base body. However the production of recesses with at least one sloping side wall to form the undercut is still complex. The cutting tools required for this often must have a corresponding contour or setting of their constituent parts. The tools, which are already costly to produce, are also subject to high wear. This also applies to the arrangement of a double tool in which the cutting plate is followed by a forming plate. The contact pressure necessary for deforming the remaining parts of the surface region is also associated with a high deceleration rate of the base body which is usually clamped rotatingly. Any catching at a change of surface region, which is normally difficult to control, may lead to disadvantageous contour courses.

SUMMARY

The present invention in one or more embodiments provides a roller tool for roughening a friction ring of a brake disk, the roller tool including a roller body including inner and outer ends and a casing surface positioned there-between, the inner end differing in cross-section dimension than the outer end, the casing surface including thereupon one or more protrusions for contacting the friction ring.

The roller tool may further include a support frame supporting the roller body. The support frame may include a short leg connected to the outer end of the roller body and a long leg connected to the inner end of the roller body. The roller tool may further include an arm connecting the short and long legs.

The inner end may be of an inner end circumference and the outer end may be of an outer end circumference greater in value than the inner end circumference. A ratio of the outer end circumference of the roller body relative to an outer ring circumference of the friction ring may be equal to a ratio of the inner end circumference of the roller body relative to an inner ring circumference of the friction ring.

The casing surface may be of a longitudinal dimension defined between the inner and outer ends, the longitudinal dimension being no smaller in value than a radial dimension of the friction ring.

The one or more protrusions may be receivable within one or more recessed portions of the friction body. The one or more protrusions may differ in material than the casing surface. The one or more protrusions may include diamond. The one or more protrusions may include a first protrusion and a second protrusion positioned next to and spaced apart from the first protrusion, the first protrusion being receivable within a first recessed portion of the friction ring and the second protrusion contacting a rib surface of a rib of the friction ring.

The present invention in one or more embodiments further provides a method of making a brake disk with a friction ring, the method including contacting the friction ring with a roller body of a roller tool described herein elsewhere.

The method may further include creating on the friction ring first and second recessed portions defining a rib therebetween, the first and second recessed portions respectively including first and second recess surfaces, the rib including a rib surface. The method may further include contacting the rib surface with one or more protrusions of the roller body. The rib surface may be contacted with a force in a direction different from a rolling direction of the roller body. At least one of the first and second recess surfaces may be contacted with one or more protrusions of the roller body. The surface and at least one of the first and second recess surfaces may be simultaneously contacted by one or more protrusions of the roller body.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

As referenced in the FIG.s, the same reference numerals are used to refer to the same components. In the following description, various operating parameters and components are described for different constructed embodiments. These specific parameters and components are included as examples and are not meant to be limiting.

The disclosed inventive concept is believed to have overcome one or more of the problems associated with known production of brake disks, and in particular problems in relation to creating desirable roughness on a friction ring of the brake disk.

Figure 4:
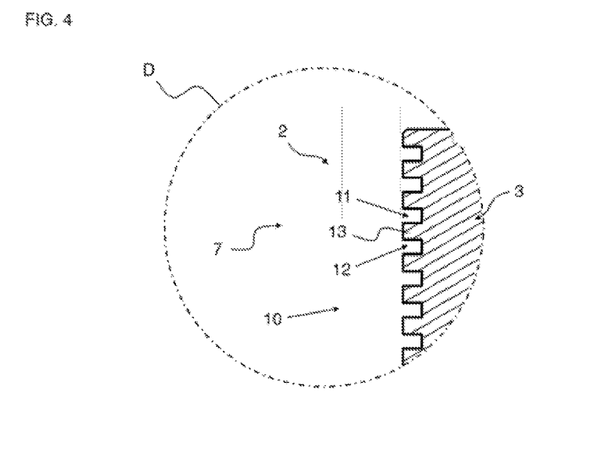
FIG. 4 illustratively depicts another view of the brake disk referenced in FIG. 3.
Figure 7:
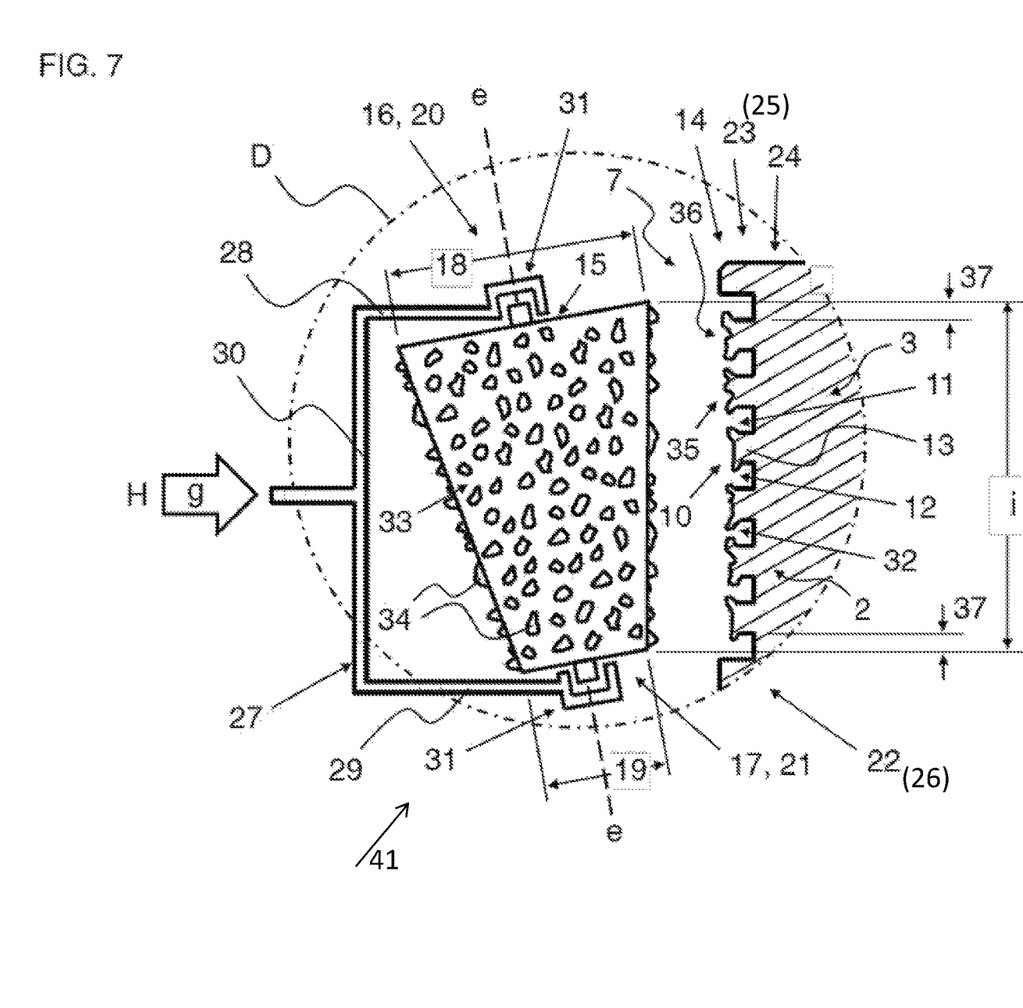
FIG. 7 illustratively depicts an enlarged, partial view of the brake disk referenced in FIG. 6 in view of a roller tool employed to create the surface roughness.

In one or more embodiments, and in view of FIG. 7 and FIG. 4 in particular, the present invention provides a roller tool 41 for roughening a friction ring 3 of a brake disk 1, the roller tool 41 including a roller body 15 including inner and outer ends 17, 16 and a casing surface 33 positioned there-between, the inner end 17 differing in cross-section dimension than the outer end 16, the casing surface 33 including thereupon one or more protrusions 34 for contacting the friction ring 3. In particular, the inner end 17 is of an inner end diameter 19 and the outer end 16 is of an outer end diameter 18 that is greater in value than the inner end diameter 19.

The roller tool 41 may further include a support frame 27 supporting the roller body 15. The support frame 27 may include a short leg 28 connected to the outer end 16 of the roller body 15 and a long leg 29 connected to the inner end 17 of the roller body 15. The roller tool may further include an arm 30 connecting the short and long legs 28, 29.

The roller body used for rolling may thus at least in portions be configured as a truncated cone, optionally completely as a truncated cone. In this configuration, a correspondingly conically configured casing surface of the roller body comes into contact, in particular in a linear contact, with the surface region.

The resulting advantage lies initially in the formation of the undercut by means of rolling. Optionally the roller body is guided so that it is rolled along the recess portions previously made, on the rib remaining in between. For this a rotation axis of the roller body may be guided perpendicular to the course of the rib. In this way any slippage between the casing surface and the rib to be rolled may be avoided. By rolling the roller body on a face of the at least one rib, the contact resistance between the roller body and the rib is reduced. As a result advantageously a relatively constant contact pressure may be transmitted to the rib via the roller body without overcoming a high friction. Consequently, a majority of the contact pressure to be applied is used for the plastic deformation of the rib, whereby a controlled formation of the undercut is possible.

The surface region to be coated is particularly optionally a friction ring face. The friction ring is the part of the base body of the brake disk which is provided for contact with a brake pad. In the proper installation position of the brake disk, for example on a vehicle, this normally comes into contact with at least two brake pads. On a braking process, these are pressed onto opposite friction ring faces defining the friction ring. The pressure is applied here via a brake caliper which surrounds the friction ring at least in regions.

The brake pads are here arranged on both sides of the brake disk between the friction ring and the brake caliper.

The surface region to be coated is therefore at least one flat, round face of the base body which has the form of a circular ring. Individual recess portions are created or produced in this circular ring.

The sometimes partially advantageous avoidance of slippage between the faces of the ribs and the casing surface of the roller body is due to its at least partially conical design. Thus the casing surface of the part of the roller body formed as a truncated cone may be guided parallel to the surface region. The rotation axis of the conical roller body is automatically angled in relation to the surface region. With reference to the conical configuration, the two end circumferences of the portion of the roller body formed as a truncated cone are adapted to the inner and outer circumferences of the surface region of the friction ring. This applies in particular to the ratio of the mutually corresponding circumferences of the roller body and the surface region. In one or more embodiments, the ratio of the small circumference of the roller body to an inner circumference of the surface region corresponds to the ratio of the large circumference of the roller body to an outer and hence correspondingly longer circumference of the surface region. As a result, the roller body may roll on the surface region without slip insofar as its rotation axis is oriented radially to a rotation center of the rotationally symmetrical base body.

In one or more embodiments, and because the undercut is only formed after production of the recess portions, no specific requirements are imposed on the cutting tool required. Optionally this is a tool with which the recess portions are produced by a material removal process. Because of the absence of any oblique positioning of parts of the cutting tool to produce the undercut, this may easily be made in the material of the base body. The cutting tools provided to form an undercut here have the disadvantage that these must either be moved into the material from an edge region, or must produce a shoulder with a corresponding widening. So first the part of the cutting tool forming the base of the recess portion must be introduced to a predefined depth in the surface region before being moved through the material at a mostly constant height.

In particular in combination with a suitable design of the casing surface of the roller body or any tilt of the rotation axis of the roller body in relation to the face of the rib, a defined deformation of the rib may be achieved, for example of the edges of the rib defining the rib from the recess portions.

Evidently to perform the method according to the invention, a combination tool is also conceivable. This may be a constructive combination of cutting tool and roller body. Thus the advantageous deformation of the rib may take place within one work process immediately after production of the recess portion.

In an advantageous refinement of the inventive concept, it is proposed that the face of the rib is embossed by at least one protrusion arranged on a casing surface 33 of the roller body 15. In one or more embodiments, 'embossing' refers to an impressing of the protrusion into the material of the base body, in particular the rib. By impressing the at least one protrusion, the material is first compacted. Optionally the protrusion is designed such that its impression causes a displacement of material. Particularly optionally the material is displaced sideways on impression of the protrusion.

In particular when the protrusion of the roller body is guided close to an edge of the rib 13 and/or close to an edge of one of the recess portions 11, 12 opposite the rib, the material may be displaced in the direction of a recess portion. In other words, in this way at least one of the edges defining the recess portions may be deformed plastically so that this protrudes at least partially into a recess portion, forming an undercut. The material ejected by the impression of the protrusion thus mainly acts towards the recess portions. The reason for this is the retention effect of the surrounding material which otherwise opposes the lateral displacement of the material. The material flowing on impression of the protrusion consequently leads to a stretching which points substantially towards the recess portions.

In this context, it is considered particularly advantageous if the roller body 15 has a plurality of protrusions 34. In this way various part regions of the edges defining the recess portions may be deformed into undercuts by a single rolling of the roller body 15. In addition on use of a plurality of protrusions 34, the face of the at least one rib is transformed such that, as well as the resulting material ejections forming undercuts, a perforated surface is produced. Depending on configuration of the roller body and recess portions, also those part surfaces of the base body defining the recess portions on the other side are covered by the roller body. Consequently, optionally within a single rolling process of the roller body on the base body, larger part regions of the surface region to be machined may be embossed simultaneously. The resulting roughening already allows an increase in the shear strength between the coating to be applied later and the surface region of the base body to be coated.

The protrusions 34 may include fine-grained hard substances arranged on the casing surface of the roller body. Optionally these may be diamond grains which for example are embedded in a nickel matrix on the casing surface of the roller body 15.

Particularly optionally, a plurality of recess portions is made in the base body so that a plurality of remaining ribs is formed between these.

In this context it is considered advantageous if at least two ribs are rolled simultaneously by the conical rolled body 15. Particularly optionally, the roller body 15 is adapted to the surface region of the base body to be rolled so that all recess portions arranged next to each other are covered completely. In this way the conical portion of the casing surface of the roller body and the ribs 13 lying next to each other between the recess portions 11, 12 may be in linear contact at the same time. Thanks to the form as a truncated cone, the casing surface 33 of the roller body 15 rolls without slip on the individual ribs 13.

In this way a length of the roller body 15 in relation to the arrangement of the recess portions may be configured such that the roller body 15 rolls over at least two or more or all ribs 13 in a single rolling process. Advantageously the length of the roller body 15 is thus adapted to the number of ribs located next to each other in the radial direction of the friction ring between the recess portions. In this way the ribs 13 may be contacted by the roller body simultaneously in a single rolling process. Particularly optionally, the roller body 15 has a length overlapping the innermost and outermost ribs. The resulting overhang of the casing surface 33 of the roller body 15 ensures that the outermost edges of the outer ribs come into contact with the casing surface, in particular with the protrusions arranged thereon. As a result corresponding undercuts are also formed on the outermost edges of the ribs.

In this way the inner and outer circumferences of the surface region are defined for example by the respective innermost and outermost ribs between the corresponding recess portions. Particularly optionally, the outer edges pointing away from each other of the innermost and outermost ribs are covered by the conical casing surface.

In this context it is noted that protrusions serving for embossing are arranged in the regions of the casing surface overlapping the ribs. This ensures that even the outermost edges are at least partly displaced into the respective innermost and outermost recess portions to form undercuts.

Thus the roller body 15 in relation to its conical portion may for example have a small inner diameter of 10.0 mm and a large outer diameter opposite this of 40.0 mm. Furthermore as an example, the surface region of the base body of the brake disk to be machined, with reference to the friction ring, may have an outer diameter of 400.0 mm and a corresponding inner diameter of 100.0 mm. On a linear contact guided radially to the base body between the surface region and the roller body, in the present example the roller body would complete 10 revolutions about its rotation axis in order to cover the entire periphery of the surface region. Theoretically here one further revolution would mean that the individual protrusions would lie precisely in the recesses previously made. This illustrates the slip-free machining process.

On positioning of the conical roller body, the necessary inclination of its rotation axis in relation to the plane of the surface region of the base body must be ensured. Optionally its rotation axis is mounted radially and axially in a suitable support frame. In relation to this, the base body may be rotated about its rotation center by suitable clamping. Furthermore the rotation axis of the roller body may have an overrun system so that when the roller body is pressed on, it may rotate about its rotation axis relative to the rotating base body.

Thanks to the production of several ribs or optionally all ribs simultaneously, a clear time-saving is achieved in relation to rolling the surface region of the base body.

In particular with simultaneous rolling of several ribs, the conical design of the roller body allows the sometimes advantageous avoidance of slip between the faces of the ribs and the casing surface of the roller body.

In an alternative embodiment, an advantageous refinement of the invention lies in that the roller body is configured such that the casing surface may be rolled on at least two of the ribs with slip. Alternatively or in combination with this, the roller body and the base body of the brake disk may be arranged in relation to each other such that the casing surface of the roller body may roll on at least one of the ribs with slip. The aim here is the substantially normal guidance of the roller body to the course of the remaining ribs, wherein the superposition of rolling and sliding of the roller body leads to the slip.

The advantage of the slip resulting at least in regions lies in that, in particular in the case of a plurality of protrusions, their embossing is associated at least partly with a slip movement parallel to the surface region of the base body. In other words, the material is both displaced laterally and also pressed laterally at least in one direction. Optionally the material is pressed in the form of burrs beyond the respective edges in the direction of the recess portions so that additional undercuts result, or those produced by embossing are further reinforced.

A slip of the conical roller body may be achieved for example by its parallel offset to a radial orientation to the rotation center of the brake disk. A further possibility is for its rotation axis to be tilted in relation to the radial orientation to the rotation center of the brake disk.

The roller body may in principle optionally be pressed onto the surface region of the base body of the brake disk with a defined force. In this way the rolling process is not controlled by distance but by force.

In one or more embodiments, the present invention is particularly advantageous if the recess portions are made in the surface region of the base body in the form of at least one cohesive spiral groove. Alternatively or in combination with this it is also considered advantageous if the recess portions are made in the surface region of the base body in the form of concentric grooves.

In this context the base body of the brake disk to be produced is optionally clamped initially rotating. Since this is a mostly rotationally symmetrical body, its rotation axis now lies in the rotation center of the rotatable clamp. While the base body is set in a rotary movement about its rotation axis, the cutting tool to produce the recess portions may be advanced up to the surface region of the base body. Now the cutting tool may be placed for example on a radially outer part region or on a radially inner part region of the surface region. Depending on embodiment, the cutting tool may now be moved into the material so that a concentric form is produced for the first recess portion. Then the cutting tool may be raised and re-introduced into the material at a distance from the recess portion previously produced. In this way a plurality of equidistant recess portions may be produced successively, wherein a rib of remaining material is formed between each of these.

Alternatively or in combination with this, at least some of the recess portions may also be arranged in a cohesive spiral form, in that after being introduced into the material, the cutting tool is moved continuously radially. The movement may be towards an edge of the base body or towards its rotation axis, depending on the starting point.

If necessary, the cutting tool guidance and the rotation of the clamped base body may be matched to each other so that the recess portions are given for example a meandering course or the remaining ribs are produced thinner in some regions and thicker in others.

Evidently the clamping may also take place if required such that the rotation axis of the base body is clamped offset to a rotation axis of the clamp. As a result, recess portions may be produced which do not run concentrically about the rotation axis of the base body.

To obtain the necessary coating, it is considered advantageous if this is applied to the surface region of the base body by means of thermal spraying. The accelerated particles may grip in the recess portions and in particular below their undercuts produced according to one or more embodiments of the present invention, to create a mechanical bonding.

The method now proposed allows an economic possibility, suitable for mass production, for preparation of the base body of a brake disk for its at least partial coating. In particular the formation of undercuts by advantageous rolling of the base body provided with the recess portions constitutes an ideal basis for a very durable coating. The arrangement of protrusions on the casing surface of the roller body, because of the displaced material, creates a plurality of burrs which together allow a mechanical bonding with the coating to be applied.

As a whole, the method proposed according to one or more embodiments creates the necessary condition for the reliable function of the thermally applied spray coating. Thanks to the simple arrangement of a plurality of undercuts, a mechanical roughening is produced which allows a firm connection of the coating to the base body. Because of the loads occurring during the braking process, in particular a high strength is required in the tangential direction to the surface region, which is achieved economically with the present method. The combination of the lateral shrink stresses of the thermally applied coating material and its adhesion to the base body, and the form fit because of the undercuts, in the present case allows a durably strong connection between the coating and the base body.

The present invention in one or more embodiments is furthermore oriented at a brake disk which may be produced in this way for a vehicle, in particular for a motor vehicle, which will be explained in more detail below.

The brake disk according to one or more embodiments includes a base body and a coating arranged on a surface region of the base body. The surface region includes at least two recess portions and at least one rib remaining between these which has at least one undercut. In this way the coating is bonded to the surface region of the base body. A roller body is provided which rolls over the rib and is configured at least in portions as a truncated cone, of which the ratio of its small circumference to an inner circumference of the surface region corresponds to the ratio of its large circumference to an outer circumference of the surface region, wherein the casing surface of the roller body configured as a truncated cone may be guided parallel to the surface region of the base body and includes protrusions, and wherein the rib has a face facing the coating, wherein the face has at least one embossing.

The resulting benefits have already been explained in connection with the method according to one or more embodiments explained above, so that reference is made here to the previous statements. This also applies to the further advantageous embodiments of the brake disk explained herein below or elsewhere.

According to an advantageous refinement, it is proposed that the at least one undercut is formed from a plastic deformation of the rib. In other words it is evident here that the undercut is produced not by a material-removal process but by an at least partially plastic displacement of individual parts of the base body into the region of the recess portions.

Particularly optionally, the face of the at least one rib may have a structure of a plurality of embossing patterns. Advantageously at least some of the embossing patterns are arranged in the region of at least one edge of the rib. The embossing patterns transform into burrs which are oriented beyond the edge towards one of the recess portions. In this way parts of the edges protrude into the recess portions, whereby corresponding undercuts are formed. Evidently the burrs may also be arranged on edges which delimit the recess portions on the sides opposite the rib. Furthermore it is considered advantageous if a plurality of recess portions and hence a plurality of ribs is arranged on the surface region of the base body.

In this context the individual recess portions may be made in the surface region of the base body in the form of at least one cohesive spiral groove. Alternatively or in combination with this, individual recess portions may be made in the surface region of the base body as concentric grooves.

Figure 1:
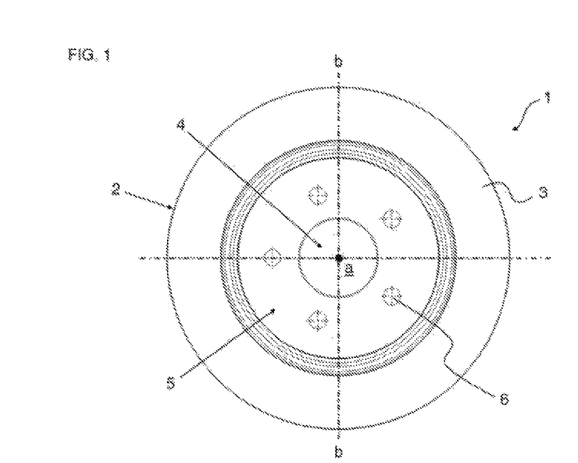
FIG. 1 illustratively depicts a front view of a brake disk in one or more embodiments.

FIG. 1 is a diagrammatic depiction of a brake disk 1 before it is coated at least in regions. This has a circular round base body 2 which extends as a rotation body rotationally symmetrically about a rotation axis a. The base body 2 is optionally made of cast iron (grey cast iron). The base body 2 has a peripheral outer friction ring 3 which is provided for contact with brake pads of a brake caliper (not shown in more detail). In the center of the base body 2 is an opening 4, which is arranged in a raised part 5 of the base body 2 clearly visible in FIG. 2.

In the present case, five through holes 6 are arranged through the raised part 5 at equal distances about the opening 4. The through holes 6 serve to receive the wheel bolts not shown here, via which the brake disk 1 may be connected to a wheel (not shown) and a wheel hub (also not shown). A plane b-b separates the brake disk 1 in its vertical in relation to the depiction of FIG. 1, wherein FIG. 2 shows the view of a section through the plane b-b.

Figure 2:
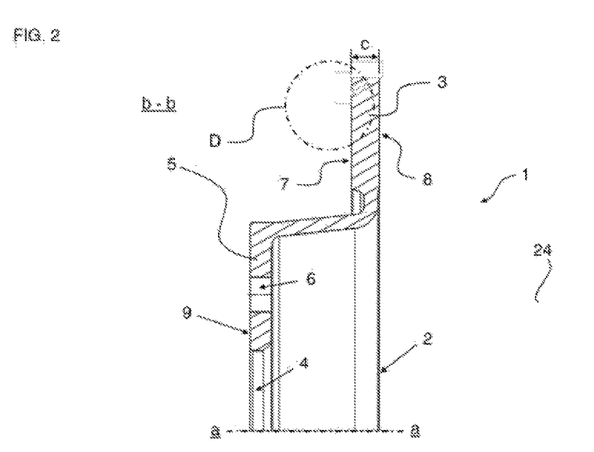
FIG. 2 illustratively depicts a partial, cross-sectional view of the brake disk referenced in FIG. 1.

FIG. 2 shows a section through the plane b-b of the base body 2 of the brake disk 1 from FIG. 1. For the sake of simplicity, the section shown refers only to half the base body which extends up to its rotation axis a. In this view it is clear that both the opening 4 and the through holes 6 extend to a contact face 9 of the raised part 5. It is clear that the raised part 5 protrudes in relation to the friction ring 3 of the base body 2. The friction ring 3 itself includes two friction faces 7, 8 oriented parallel to each other, more specifically a first friction face 7 and a second friction face 8. The friction faces 7, 8 delimit the friction ring 3 in its thickness c, and on a braking maneuver, come into contact with the brake pads (not shown in more detail).

Figure 3:
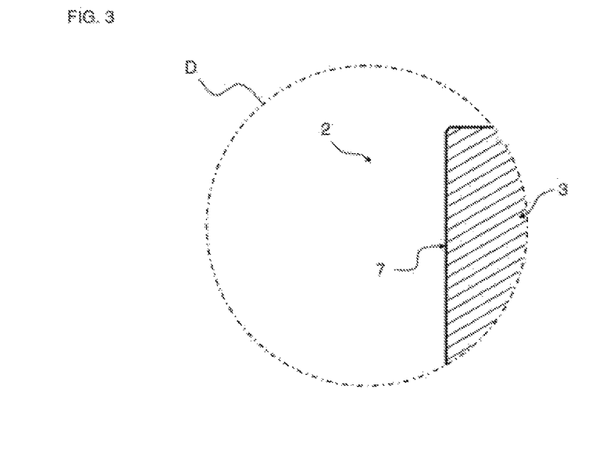
FIG. 3 illustratively depicts a partial, detailed view of the brake disk referenced in FIG. 2.

The friction ring 3 has a circle D indicated in dotted lines, the content of which is shown in FIG. 3 as an enlarged extract of a detail of the friction ring 3.

FIG. 3 shows the content of the dotted circle D from FIG. 2 as an enlarged extract of a detail of the friction ring 3. In the present case, part of the friction ring 3 is shown, more specifically its first friction face 7, in its starting condition. The friction face 7 is initially a flat face of the friction ring 3. Further machining of the base body 2 will be explained in more detail below with reference to the friction face 7 of the base body 2.

FIG. 4 again shows the content of the circle D from FIG. 2, as already shown in FIG. 3. It is clear from the enlargement of the friction ring 3 shown here in relation to FIG. 3, in the region of the first friction face 7, that a plurality of recess portions 11, 12 have been produced in an unspecified manner in a surface region 10 of the base body 2. The recess portions 11, 12 have been arranged to form ribs 13 remaining between them in the surface region 10. Representatively and for greater clarity, in FIG. 4 only two directly adjacent recess portions 11, 12 are marked with reference numerals, specifically a first recess portion 11 and second recess portion 12, and the rib 13 remaining between these two recess portions 11, 12.

FIG. 4 therefore shows the situation which results after the production of the recess portion 11, 12 in the surface region 10 of the base body 2, in the present case in the friction ring 3. For this a cutting tool (not shown in more detail) is used to make the recess portions 11, 12 in the base body 2.

Figure 5:
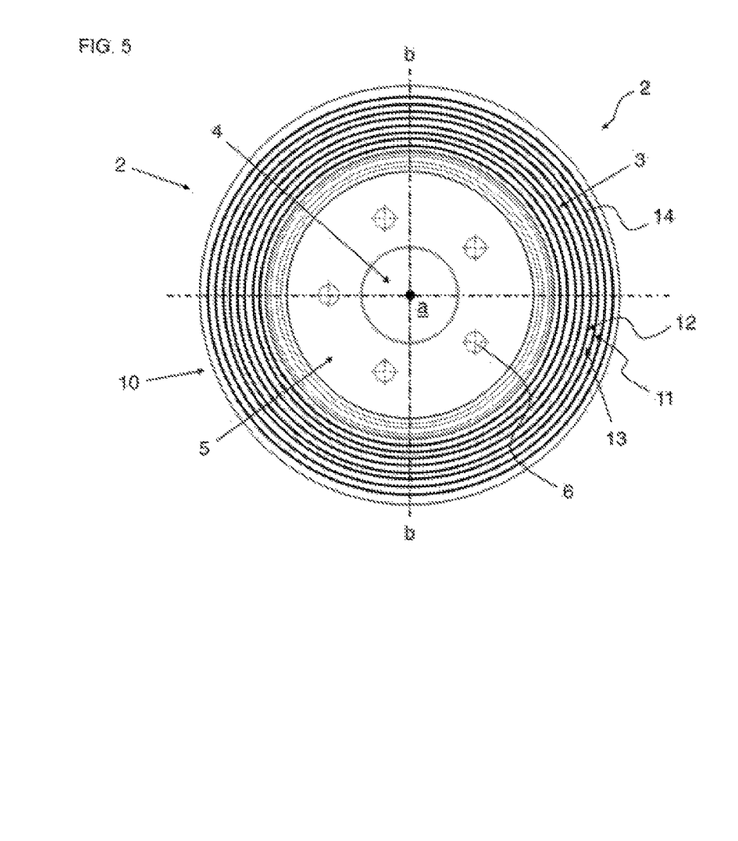
FIG. 5 illustratively depicts another view of the brake disk referenced in FIG. 1 and FIG. 4.

FIG. 5 shows the arrangement of the recess portions 11, 12 on the surface region 10 of the base body 2 in a top view. In the present case the recess portions 11, 12 are arranged in the form of concentric grooves 14 about the rotation axis a of the base body 2 in the surface region 10 of the friction ring 3.

Figure 6:
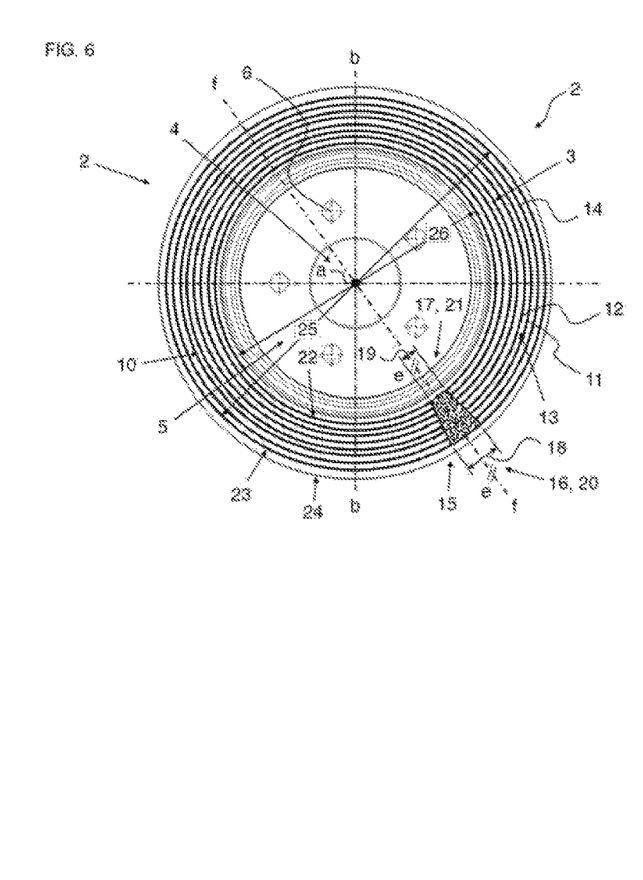
FIG. 6 illustratively depicts yet another view of the brake disk referenced in FIG. 1 and FIG. 4.

FIG. 6 shows the implementation of a further machining step. Here a roller tool in the form of a roller body 15 is applied to the remaining ribs 13 of the friction ring 3. The roller body 15 is a rotationally symmetrical body which may rotate about its rotation axis e. Furthermore the roller body 15 is formed conical, wherein it is configured as a truncated cone over its extension in the direction of its rotation axis e. As may be seen, the roller body 15 tapers from a first end 16 to a second end 17, wherein the first end 16 has a larger diameter 18 and the second end 17 has a smaller diameter 19. The second end 17 of the roller body 15 is oriented with its small diameter 19 towards the rotation axis "a" of the base body 2. In this arrangement, the roller body 15 extends with its rotation axis e towards a direction "f" aligned radially to the rotation axis a.

The roller body 15 serves for rolling the base body 2, more specifically the friction ring 3. For this the base body 2, in a manner not shown in detail, is temporarily arranged in a clamp. In the clamp, the base body 2 is rotated about its rotation axis a. The roller body 15 is pressed onto the friction ring 3 so that this has a linear contact. The linear contact is interrupted insofar as the roller body 15 comes into contact primarily with the ribs 13 between the recess portions 11, 12.

As depicted, the roller body 15 extends optionally over all ribs 13 arranged next to each other in the radial direction "f." Due to the resulting coverage of the grooves 14 previously made, and in particular of the ribs 13, a substantial time-saving is achieved. So all ribs 13 come into contact with the roller body 15 during a single complete rotation (360°) of the base body 2 about its rotation axis "a." Particularly optionally, a suitable ratio is observed in relation to the roller body 15 and the diameter of the base body 2, in particular of the friction ring 3 to be coated. A specific ratio to each other must be maintained in order to prevent any slip between the surface region of the friction ring 3 and the roller body 15. For this the circumferences 20, 21 resulting from the large diameter 18 and the small diameter 19 of the roller body are adapted accordingly to an inner circumference 22 and an outer circumference 23 of the friction ring 3 to be coated. For example the circumferences 20, 21 of the roller body 15 are derived in a manner known to the person skilled in the art from the mathematical product of pi ($\pi$) times the respective diameter 18, 19.

In other words, the ratio of a first circumference 20 located at the first end 16 of the roller body 15 to the outer circumference 23 of the surface region 10 of the friction ring 3 covered by the roller body 15, corresponds to the ratio of a second circumference 21 of the roller body 15 located at the second end 17 to the inner circumference 22 of the surface region 10 of the friction ring 3 covered by the roller body 15. Here the inner circumference 22 lies close to the raised part 5 while the outer circumference 23 is located more towards an edge 24 of the friction ring 3.

Expressed in FIGs. for example, the roller body 15 may have a small diameter 19 of 10.0 mm and an opposite large diameter 18 of 40.0 mm. Furthermore as an example, the surface region 10 of the base body 2 of the brake disk 1 to be machined may in relation to the friction ring 3 have an outer diameter 25 defining the outer circumference 23 of 400.0 mm and an inner diameter 26 defining the inner circumference 22 of 100.0 mm. On linear contact between the surface region 10 and the roller body 15 which is guided radially to the base body 2, in the present example the roller body performs ten revolutions about its rotation axis a in order to cover the entire periphery of the surface region 10.

FIG. 7 shows the result of the machining step from FIG. 6 in the side view already known from FIG. 4 of part of the friction ring 3 within the dotted circle D. As may be seen, the relevant ribs 13 are formed by rolling with the roller body 15. The roller body 15 is shown in a state once again raised from the first friction face 7 after rolling. Due to the configuration of the roller body 15 as a truncated cone, and with retention of the ratios, the roller body 15 was first placed on the ribs 13 and rolled thereon perpendicular to the course of the ribs 13 without slipping.

The roller body 15 for this is held in the support frame 27. The support frame 27 is designed U-shaped, wherein it has two legs 28, 29 of different lengths and the arm 30 connecting these. Between the legs 28, 29, the roller body 15 is held by its rotation axis e. The connection between the ends of the legs 28, 29 and the rotation axis e of the roller body 15 takes place via suitable bearings 31. The bearings 31 are configured to mount the roller body 15 both radially and axially in the support frame 27. Furthermore the bearings 31 have an overrun system so that the roller body 15, on contact with the friction ring 3 of the base body 2 rotating about its rotation axis "a," is rotated relative thereto about its rotation axis e. Due to the support frame 27 and in particular its bearing 31, the roller body 15 is fixed in the radial direction "f" in relation to the friction ring 3 so that no relative movements are possible in the direction f either towards the rotation axis a of the base body 2 or away from this. In other words, the roller body 15 may not be displaced in the direction of its linear contact with the friction ring 3.

Due to the formation as a truncated cone, the rotation axis "e" of the roller body 15 is tilted in relation to the substantially flat plane of the surface region 10 of the base body 2. During rolling, the roller body 15 is subjected to pressure via a force H in a direction g running perpendicular to the first friction face 7 and oriented towards the base body 2. For this the force H is applied to the support frame 27 which transmits this optionally in equal parts to the two ends 16, 17 of the roller body 15 via the respective bearings 31. As a result the respective ribs 13 are at least partially displaced plastically, forming undercuts 32, in the direction of the recess portions 11, 12 or grooves 14.

As may be seen, a casing surface 33 of the roller body 15 has a plurality of protrusions 34. In the present case the protrusions 34 are optionally a diamond graining. The advantage here lies in high strength of the protrusions 34 thus formed. By the arrangement of the protrusions 34 on the casing surface 33, individual faces 35 of the respective ribs 13 are additionally embossed during rolling by the roller body 15. For this their faces 35 have crater-like embossings 36 which cause in particular a lateral displacement of the material of the ribs 13. As a result the formation of the undercuts 32 is substantially reinforced and at the same time the roughness of the faces 35 of the ribs 13 increased.

A length "i" of the casing surface 33 of the roller body 15 extending parallel to the surface region 10 of the friction ring 3 is adapted to the width of the surface region 10 to be rolled extending in the radial direction of the friction ring 3. Particularly optionally, the casing surface 33 fitted with protrusions 34 has an overhang 37 extending over the last ribs 13 on the inner circumference 22 and on the outer circumference 23 respectively. This ensures that all ribs 13 may be rolled simultaneously via the linear contact, not shown here in more detail, between their faces 35 and the casing surface 33 of the roller body 15 or its protrusions 34, and the advantageous undercuts 32 are also formed on the innermost and outermost grooves 14 respectively.

Figure 8:
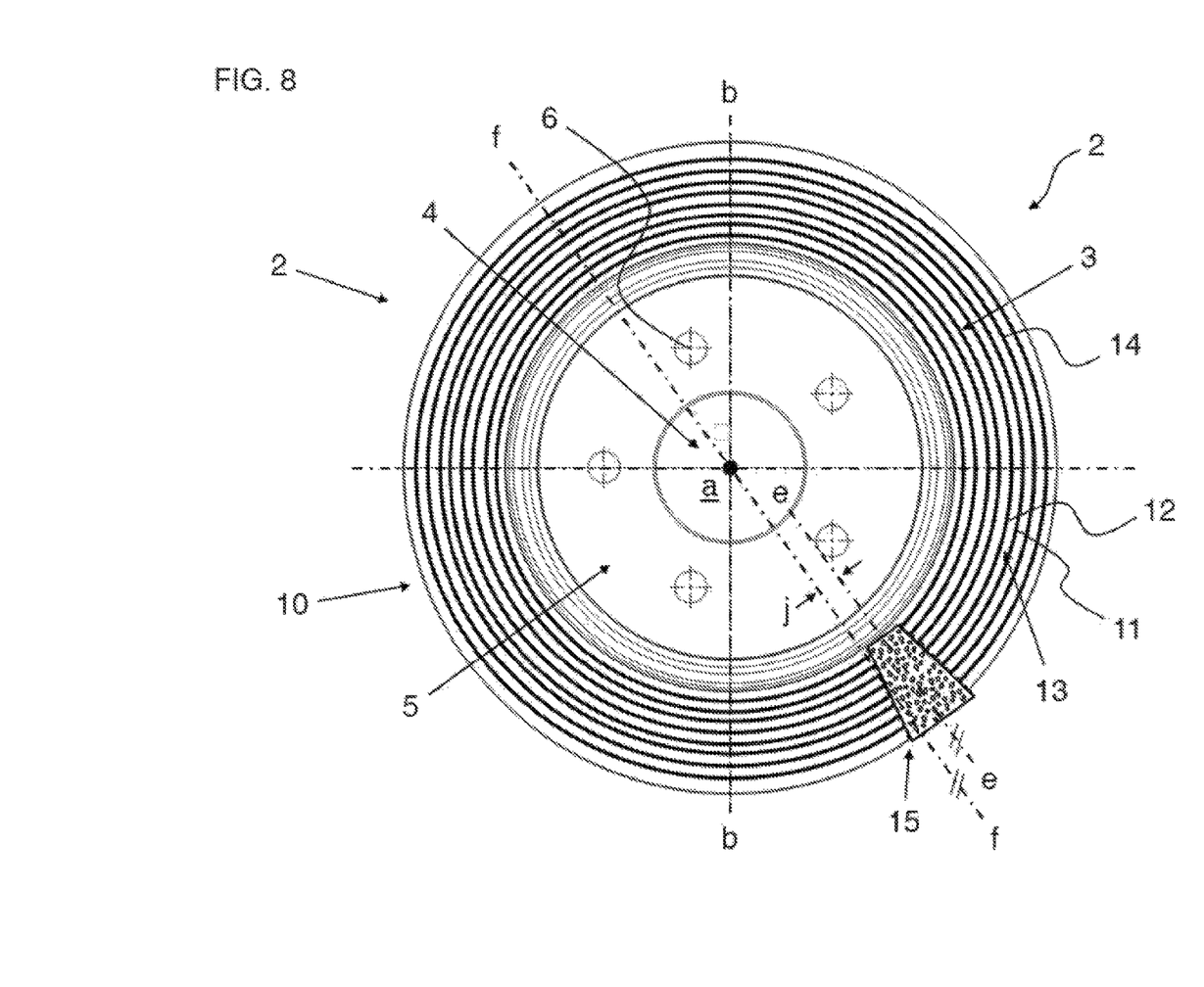
FIG. 8 illustratively depicts an enlarged view of the brake disk referenced in FIG. 6.
Figure 9:
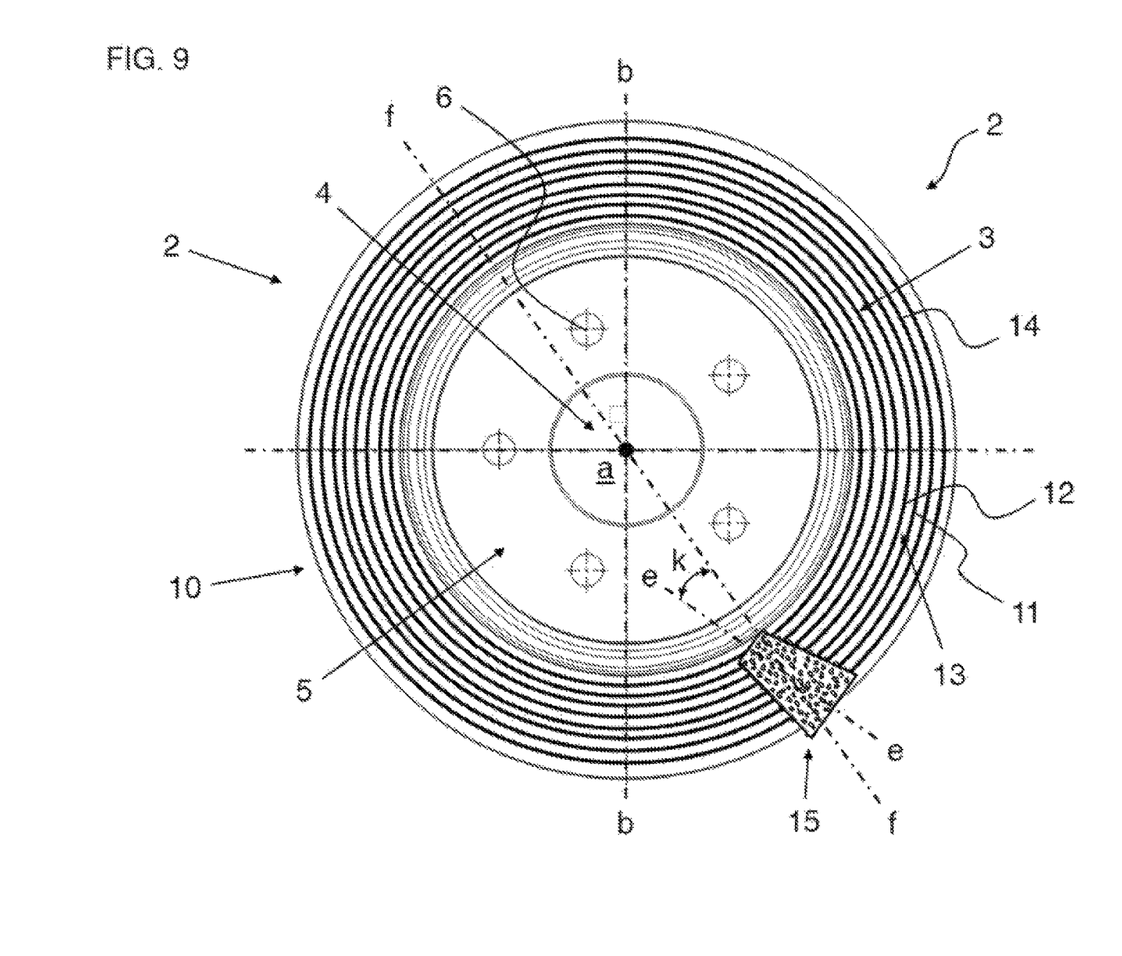
FIG. 9 illustratively depicts another enlarged view of the brake disk referenced in FIG. 6.

FIGS. 8 and 9 each show a possibility for achieving, if required, a slip between the conical roller body 15 and the surface region 10 or ribs 13 of the base body 2. Due to slip, the rolling of the roller body 15 and in particular of its protrusions 34 which occurs on rolling, is overlaid with a further relative movement which may have a positive effect on the formation of the undercuts 32.

In the view shown in FIG. 8, it is clear that for this the conical roller body 15 with its rotation axis e runs at a distance "j" parallel to the direction "f" oriented radially towards the rotation axis a of the base body 2. In other words, rotation axis e and direction "f" here are shifted axially parallel to each other.

In contrast, FIG. 9 shows the tilt of the rotation axis "e" of the roller body 15 in relation to the direction "f." As a result the rotation axis e and the direction f enclose an angle "k" between them.

Figure 10:
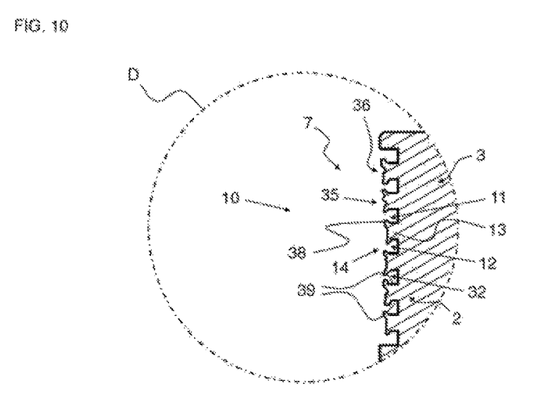
FIG. 10 illustratively depicts a partial view of the brake disk referenced in FIG. 6 and FIG. 7.

FIG. 10 illustrates the effects of the roller body 15 guided with slip in FIGS. 8 and 9 in a side view of the friction ring 3 within the dotted circle D. The material of the ribs 13, which is in any case displaced by the protrusions 34, is also pressed sideways, whereby advantageous burrs 38 may form. The burrs 38 are oriented beyond the edges 39 of the ribs 13 towards the recess portions 11, 12 or grooves 14 such that the formation of the undercuts 32 is reinforced.

Figure 11:
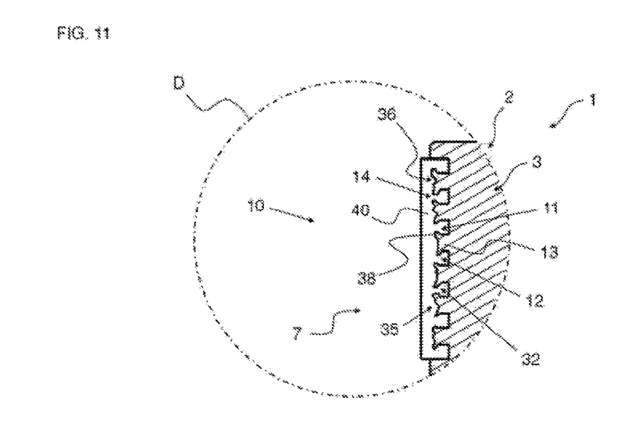
FIG. 11 illustratively depicts another partial view of the brake disk referenced in FIG. 6 and FIG. 7.

FIG. 11 shows the extract from FIGS. 3, 4 and 7 and 10 in relation to the brake disk 1 now completed. In the meantime the relevant ribs 13 have been rolled with the roller body 15. Furthermore in a manner not shown in more detail, a coating 40 has been applied to the surface region 10 of the base body 2, primarily in the region of its friction ring 3. This is optionally a metallic coating applied by thermal spraying.

As may be seen, the coating 40 has a bonding to the surface region 10 of the base body in the region of the friction ring 3. This results from the filling of the recess portions 11, 12 or the grooves 14, and in particular by the cohesive coating 40 running under the undercuts 32. In other words, the undercuts 32 and the burrs 38 are surrounded in regions by the coating 40. In this way a mechanical connection is created between the coating 40 and the surface region 10 of the base body 2, which connection is based amongst others on an advantageous form fit. The additional penetration of the coating 40 into the embossings 36 further improves the shear strength parallel to the first friction face 7 of the friction ring 3.

Figure 12:
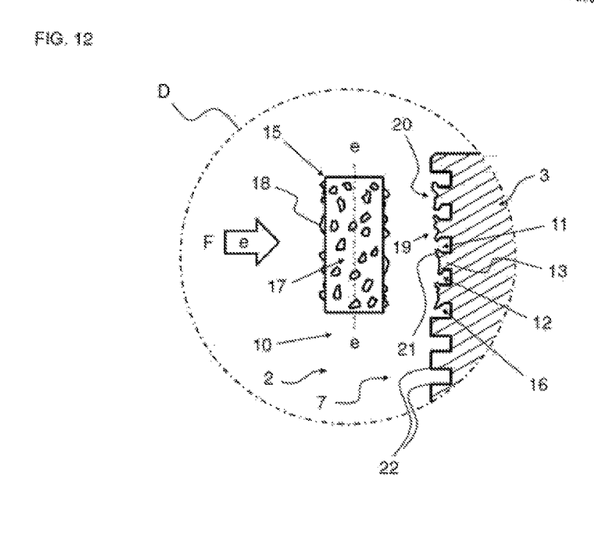
FIG. 12 illustratively depicts yet another partial view of the brake disk referenced in FIG. 6 and FIG. 7.

FIG. 12 shows an alternative embodiment of the roller body 15. In relation to the conical configuration of FIG. 7, in the present case this is designed as a cylinder with parallel casing surface 33. In the present case the cylindrical roller body 15 is guided with its rotation axis e parallel to the first friction face 7 of the base body 2, more specifically its friction ring 3. Here again, the roller body 15 during rolling is exposed to pressure via the force H in direction g oriented towards the base body 2. As a result some of the ribs 13 are plastically displaced at least partially, forming undercuts 32, towards at least one of the recess portions 11, 12 or the grooves 14.

Since the cylindrical roller body 15 shown here is rolled over at least two ribs 13, on guidance of the roller body 15 perpendicular to the course of the ribs 13, a slip occurs. This applies in particular also if the roller body 15 configured in this way is guided with its rotation axis e in the radial direction f (similar to FIG. 6). In principle, this roller body 15 may also be configured so that its length i, extending in the direction of the rotation axis e of its casing surface 33, is oriented to the corresponding width of the surface region 10 to be rolled (similar to FIG. 7). Here again all relevant ribs 13 are rolled simultaneously with the roller body 15.

In one or more embodiments, the present invention as set forth herein is believed to have overcome certain challenges faced by known production of brake disks, and in particular problems in relation to creating desirable roughness on a friction ring of the brake disk. However, one skilled in the art will readily recognize from such discussion, and from the accompanying drawings and claims that various changes, modifications and variations may be made therein without departing from the true spirit and fair scope of the invention as defined by the following claims.

What is claimed is:

1. A roller tool for roughening a friction ring of a brake disk, comprising:
   a roller body including inner and outer ends and protrusions; each end having a circumference, the inner end circumference being smaller than the outer end circumference; and
   a support frame including short and long legs connected to the outer and inner ends, respectively, and an arm connecting therebetween, that forms a roller body axis of rotation intersecting the arm at an angle.

2. The roller tool of claim 1, wherein the roller body includes a casing surface, the protrusions differing in material from the casing surface.

3. The roller tool of claim 1, wherein the protrusions includes a first protrusion and a second protrusion positioned next to and spaced apart from the first protrusion.

4. The roller tool of claim 1, wherein the shape of the roller body is a truncated cone.

5. The roller tool of claim 1, wherein a ratio of an outer end diameter to an inner end diameter is 4:1.

6. The roller tool of claim 1, wherein the angle is an acute angle.

7. The roller tool of claim 1, wherein the protrusions include diamond grains.

8. A roller tool for roughening a friction ring of a brake disk, comprising:
   a roller body including inner and outer ends and a casing surface supporting protrusions differing in material from the casing surface, each end having a circumference, and the inner end circumference being smaller than the outer end circumference; and
   a support frame including short and long legs connected to the outer and inner ends, respectively, and an arm connecting therebetween, that forms a roller body axis of rotation intersecting the arm at an angle.

9. The roller tool of claim 8, wherein the casing surface is of a longitudinal dimension defined between the inner and outer ends.

10. The roller tool of claim 8, wherein the protrusions include a first protrusion and a second protrusion positioned next to and spaced apart from the first protrusion.

11. The roller tool of claim 8, wherein the shape of the roller body is a truncated cone.

12. The roller tool of claim 8, wherein a ratio of an outer end diameter to an inner end diameter is 4:1.

13. The roller tool of claim 8, wherein the protrusions include diamond grains and the casing surface includes a nickel matrix.

14. A roller tool for roughening a friction ring of a brake disk, comprising:
   a roller body including inner and outer ends and protrusions, each end having a circumference, and the inner end circumference being smaller than the outer end circumference; and
   a support frame including short and long legs connecting to the outer and inner ends, respectively, with outer and inner bearings, respectively, the support frame further including an arm connecting between the short and long legs, and the support frame forming a roller body axis of rotation intersecting the arm at an angle.

15. The roller tool of claim 14, wherein the roller body includes a casing surface, and the protrusions differ in material from the casing surface.

16. The roller tool of claim 14, wherein the shape of the roller body is a truncated cone.

17. The roller tool of claim 14, wherein a ratio of an outer end diameter to an inner end diameter is 4:1.

18. The roller tool of claim 14, wherein the protrusions include diamond grains.

* * * * *